United States Patent
Wang et al.

(10) Patent No.: US 7,038,341 B1
(45) Date of Patent: May 2, 2006

(54) MAGNETIC SUSPENSION BEARING WITH DAMPING SYSTEM

(75) Inventors: Chien-chang Wang, Hsinchu (TW);
Pi-cheng Tung, Hsinchu (TW);
Ren-bin Xiao, Hsinchu (TW);
Wei-cheng Chen, Hsinchu (TW);
Chien-sheng Liu, Hsinchu (TW);
Yu-hsiu Chang, Hsinchu (TW);
Der-ray Huang, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 10/980,871

(22) Filed: Nov. 4, 2004

(51) Int. Cl.
*H02K 7/09* (2006.01)

(52) U.S. Cl. .................................... 310/90.5
(58) Field of Classification Search ............. 310/90, 310/90.5, 67 R
See application file for complete search history.

(56) References Cited

U.S. PATENT DOCUMENTS

| | | | |
|---|---|---|---|
| 4,082,376 A | 4/1978 | Wehde et al. | |
| 5,506,459 A | 4/1996 | Ritts | |
| 5,521,448 A * | 5/1996 | Tecza et al. | 310/90.5 |
| 5,587,617 A * | 12/1996 | Dunfield et al. | 310/90.5 |
| 6,050,785 A | 4/2000 | Horng | |
| 6,097,120 A | 8/2000 | Horng | |
| 6,218,751 B1 | 4/2001 | Bohlin | |
| 6,420,810 B1 | 7/2002 | Jeong | |
| 6,448,679 B1 | 9/2002 | Imlach | |
| 6,617,732 B1 | 9/2003 | Lin et al. | |
| 6,703,736 B1 * | 3/2004 | Wang et al. | 310/90.5 |

OTHER PUBLICATIONS

Wang et al., An Innovative Dampling System For Magnetic Bearing Motor Systems, Nov. 13-16, 2003, ISAMT'03, p. 279.

* cited by examiner

*Primary Examiner*—Darren Schuberg
*Assistant Examiner*—Nguyen Hanh
(74) *Attorney, Agent, or Firm*—Rabin & Berdo, P.C.

(57) ABSTRACT

A magnetic suspension bearing with damping system includes a stator having a stator magnetic unit mounted on the internal portion of the stator, and a rotor rotatably located at the stator. A rotor magnetic unit installed on the rotor corresponding to the stator magnetic. The rotor further has a yoke having a magnetic driving unit corresponding to the external portion of the stator. A magnetic damping device located has a magnetic unit and an elastic unit, wherein the magnetic unit corresponding to the magnetic driving unit generates magnetic force between them, and the elastic unit coupled below the magnetic unit uses to reduce the vibration of the magnetic unit for maintaining the rotation of the rotor smooth and steady.

8 Claims, 8 Drawing Sheets

MAGNETIC SUSPENSION BEARING WITH DAMPING SYSTEM

FIELD OF THE INVENTION

The invention relates to a magnetic suspension bearing, and more particularly to a magnetic suspension bearing with damping system that can greatly reduce the vibration of the rotor, and is simple and low in cost.

BACKGROUND OF THE INVENTION

In recent years rapid innovations and developments have occurred with electronic products. With the continuous advance of semiconductor manufacturing technologies, electronic products have become more powerful and their prices have dropped. They are now widely accepted by the general public. Nowadays there are a wide variety of electronic products on the market. For the driving motor bearings used in information storage devices, there are oil impregnated bearings, ball bearings, and the like. The oil impregnated bearing has a lower price and thus cost advantage. However, its service life is shorter. The ball bearing has a longer service life, but it is more expensive and has a lower capability to withstand impact. These two types of bearings have their spindles in contact with the inner walls of the bearings. As a result, the motor tends to generate vibration and noise, and its service life becomes lower. On the other hand, dynamic bearings also are frequently used in the industry. The dynamic bearing is more precise and has a longer service life. It has become the mainstream in the market. However, it has starting friction and wearing problem that has yet to be overcome. Moreover, its production cost is higher, and production yield still does not reach the level desired. These issues remain to be resolved.

It is well known that the magnets of the same polarity repel each other. This property can be used to reduce the wearing when the spindle rotates. Thus it gradually becomes an important research and development direction in the industry. Some techniques are known in the art. For instance, U.S. Pat. Nos. 5,521,448 and 6,448,679 and so on disclose a technique regarding spindle motor having magnetic bearing. U.S. Pat. No. 5,521,448 discloses a technique regarding damping for passive magnetic bearings. It includes a passive magnetic bearing where the magnets are arranged radially in concentric rings. The rotating portion of the bearing is fixed to the shaft while the non-rotating stack is mounted to a fixed structure through a resilient material so that vibratory loads are carried in shear. Two sheets may be used, one on each side of the stationary bearing mount, so that the resilient material can be preloaded axially. The shear stiffness of the resilient material is adjusted so that it is low enough to permit the mount material to be strained enough to absorb a significant amount of energy and thereby produce system damping.

U.S. Pat. No. 6,448,679 discloses a type of passive magnetic support and damping system. It is comprised of a series of disks or annular rings of permanently magnetized material fixedly attached to the rotor of the machine. The stator portion is also comprised of a series of annular rings of permanently magnetized material, which are positioned concentrically with the rotor magnets. The stator and rotor magnets are formed and positioned such that a radial gap is present between said stator magnets and said rotor magnets. At least one, and preferably an even number, of the stator magnets are mounted in a damping material, which, in turn, is fixedly attached to the machine stator. This damping material may be an elastomeric material in response to shear or compressive strains. The soft mounted stator magnets provide damping to the system. The remaining stator magnets are fixedly attached to the machine stator and provide stiffness. By varying the number, size, and magnetic strength of the stator magnets mounted in these two ways, the stiffness and damping of the bearing assembly can be varied substantially independently.

However, the foregoing conventional techniques suit to large scale mechanism. In other words, it is so complex so that difficult to assemble, and unable apply to the small scale motor which are widely used in various types of electronic products, especially on data storage devices.

Besides, U.S. Pat. Nos. 6,050,785 and 6,097,120 disclose another type of damping system applied to a ball bearing or a sleeve bearing. They have a balance plate mounted above the circuit board corresponding to the magnet of the rotor, for providing a balancing force to ensure the rotor keeping at the center position corresponding to the stator. However, above-mentioned conventional techniques remain unstable. That is to say, the motors such as the ball bearing or the sleeve bearing are difficult to prevent from the rotor touching with the stator even with the balancing force between the balance plate and the magnet of the rotor. Moreover, the efficiency of the dissipation the vibration energy is limited because of lack of damper.

In short, there are still a lot of problems in the conventional techniques remained to be overcome.

SUMMARY OF THE INVENTION

In view of the aforesaid disadvantages, the primary object of the invention is to provide a magnetic suspension bearing with damping system that has capability to reduce the vibration of the rotor and may be fabricated at a lower cost.

The magnetic suspension bearing with damping system of the invention is adopted for use on rotational devices such as precision motor bearings, precision air fan bearings and the like, which are widely used in various types of electronic products, especially on data storage applications.

The magnetic suspension bearing with damping system generally consists of a stator, a rotor and a magnetic damping device. The stator has a stator magnetic unit mounted on the internal portion of the stator. The rotor located at the internal portion of the stator includes a rotor magnetic unit corresponding to the stator magnetic unit. There is a yoke coupled with an one end of the rotor, and a magnetic driving unit corresponding to the external portion of the stator mounts on the yoke.

The magnetic damping device located below the magnetic driving unit. The magnetic damping device has a magnetic unit and a elastic unit. The magnetic unit corresponding to the magnetic driving unit uses to generate magnetic force between them. The elastic unit coupled below the magnetic unit so reduces greatly the vibration of the magnetic unit.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
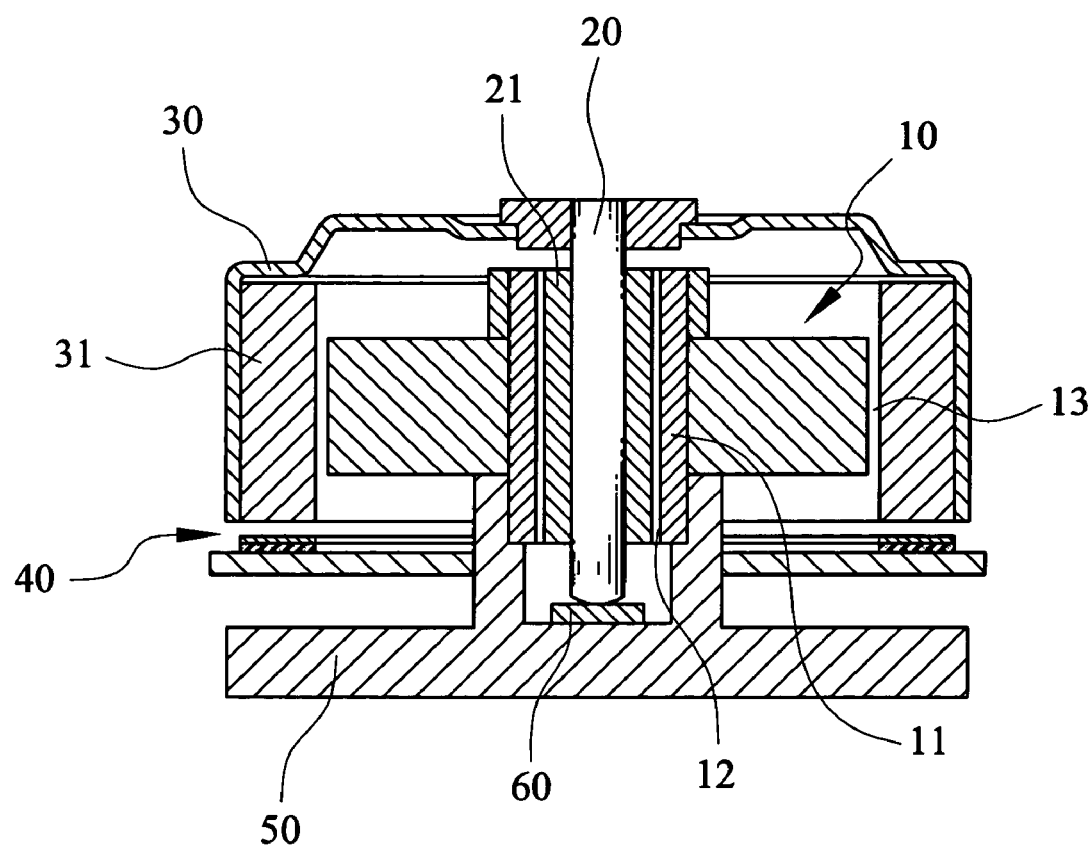
FIG. 1 is a sectional view of a first embodiment of the magnetic suspension bearing with damping system of the invention.

The magnetic suspension bearing of the invention aims at reducing the vibration of rotor and increase the service life of the product, and to provide a simple magnetic bearing at a low coast. Refer to FIG. 1 for a first embodiment of the invention. The invention includes a stator 10, a rotor 20 and a magnetic damping device 40. The stator 10 such as the iron core has an internal portion 12 and an external portion 13, and the rotor 20 may rotatably locate at the internal portion 12. A loading section 60 such as a friction pad installed on base dock 50 locates at the bottom end of the rotor 20 to hold the rotor 20, and the rotor 20 is in contact with the loading section 60 on a single point. A yoke 30 couples with a top end of the rotor 20, and the yoke 30 includes a magnetic driving unit corresponding to the external portion 13 of the stator 10.

Figure 2:
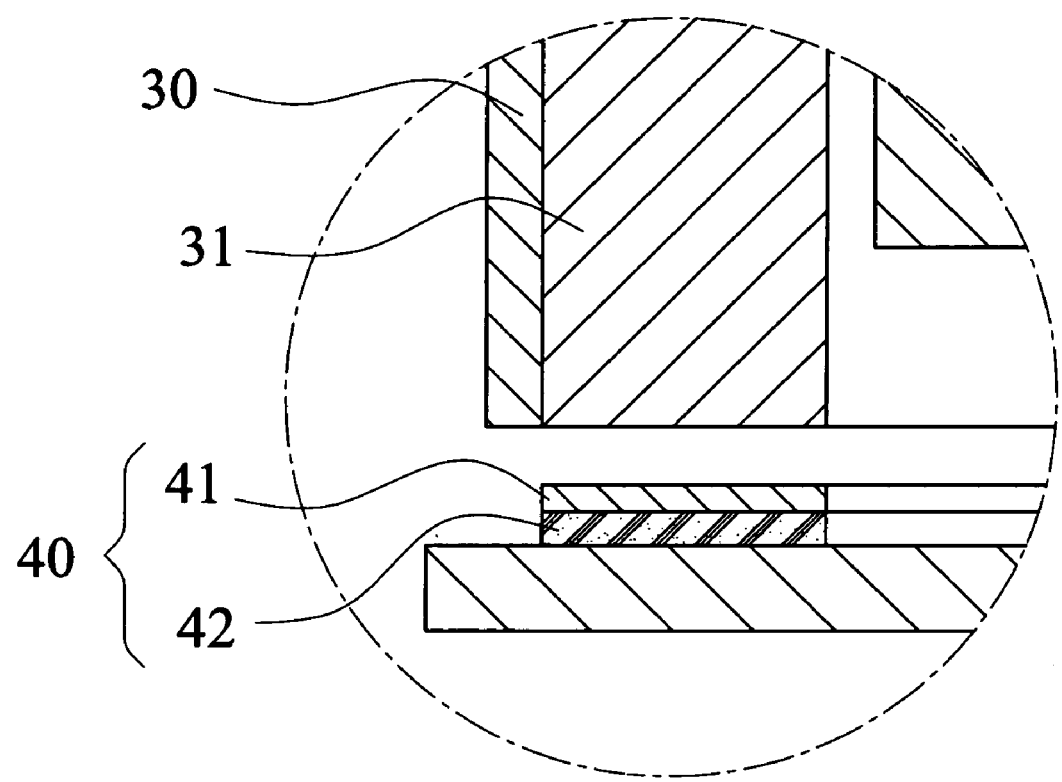
FIG. 2 is a schematic view of the invention showing the magnetic damping device and the magnetic driving unit of the yoke.
Figure 3A:
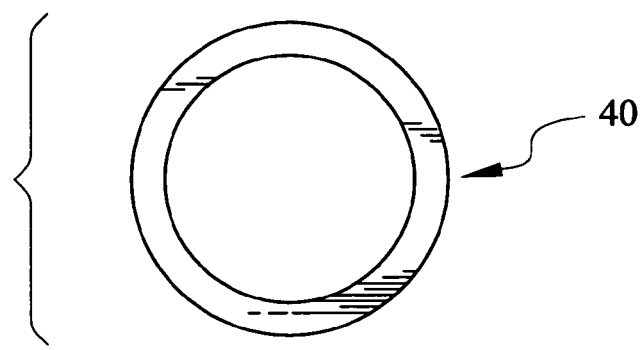
FIGS. 3A through 3C are schematic views of the invention showing the shape of the magnetic unit of the magnetic damping device
Figure 3B:
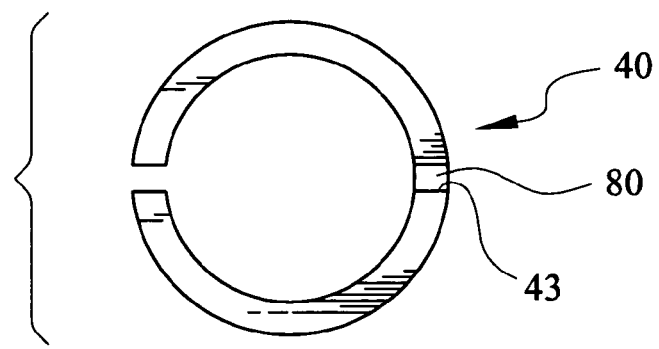
Figure 3C:
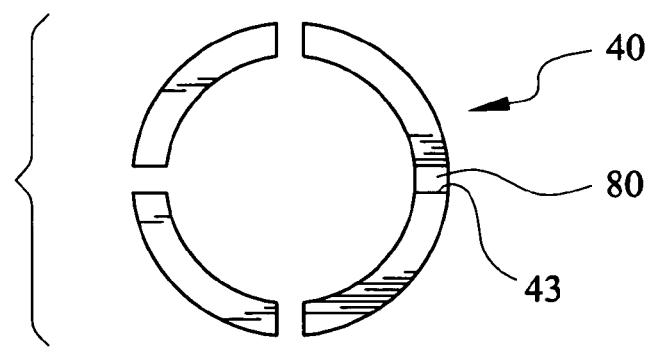

The stator 10 has a stator magnetic unit 11 mounted on the internal portion 12. The rotor 20 includes a rotor magnetic unit 21 corresponding to the stator magnetic unit 11. The stator magnetic unit 11 and the rotor magnetic unit 21 generate repulsive magnetic force between them to enable the stator 10 and the rotor 20 to maintain a radial suspension state and space them from one another at a selected distance in normal conditions. Refer to FIG. 2, the magnetic damping device 40 installed on the base dock 50 includes a magnetic unit 41 and an elastic unit 42, wherein the former is made of permeance material and the latter is made of rubber material. The magnetic damping device 40 locates below the magnetic driving unit 31, and further, the magnetic unit 41 corresponds to the magnetic driving unit 31. The elastic unit 42 is located below the magnetic 41, in other words, the elastic unit 42 is mounted between the base dock 50 and the magnetic 41. In addition, refer to FIGS. 3A through 3C, these are shapes of the magnetic damping device 40, the magnetic damping device 40 can be fabricated at circle type, or separated into semicircle and quadrant. Refer to FIG. 3B and FIG. 3C, a sensor 80 installs on the space 43 of the magnetic damping device 40 for detecting the magnetic flux of the magnetic driving unit 31.

Figure 4:
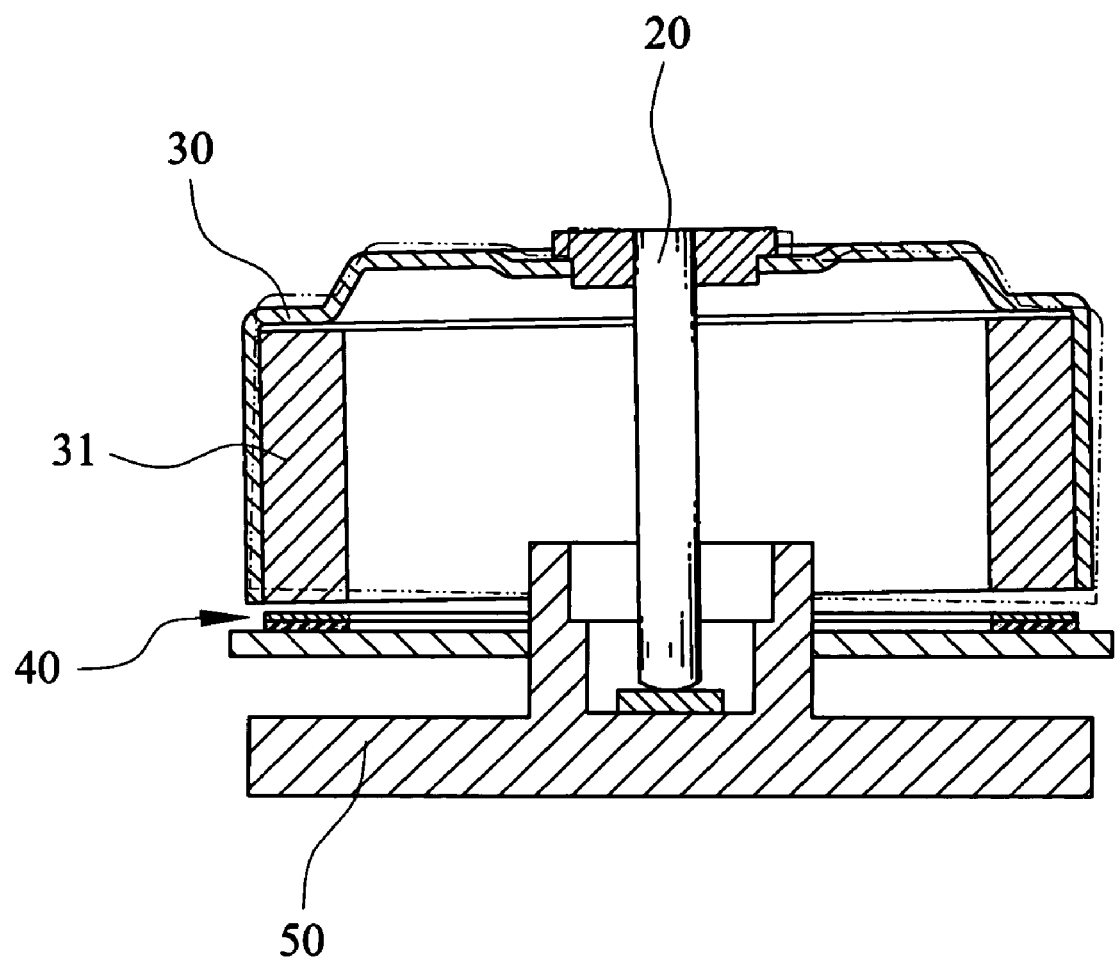
FIG. 4 is a sectional view of the invention showing the swing phenomenon of the rotor.

Please Refer to FIG. 4, the yoke 30 of the rotor 20 receives the external force and then causes swing. In the meanwhile, the magnetic unit 41 results in vibration via the magnetic force between the magnetic driving unit 31 and the magnetic unit 41. The vibration of the magnetic unit 41 absorbs by the elastic unit 42, and then moderates the unstable equilibrium of the yoke 31 of the rotor 20. By using Fast Fourier Transform (FFT) and impulse method, we obtain experiment results of the time response of the conventional techniques as FIG. 5A, and experiment results of the frequency response of the conventional techniques as FIG. 6A. They indicate that the rotor 20 generates the vibration and related frequency response when the rotor 20 received the external force.

A further research and study indicates that a vibration damper installed on the product may reduce the vibration of the rotor 20. Hence the invention has the magnetic unit 41 installed corresponding to the magnetic driving unit 31 to response the magnetic force between them, and then utilizes the elastic unit 42 for absorbing the vibration of the magnetic unit 41.

Figure 5A:
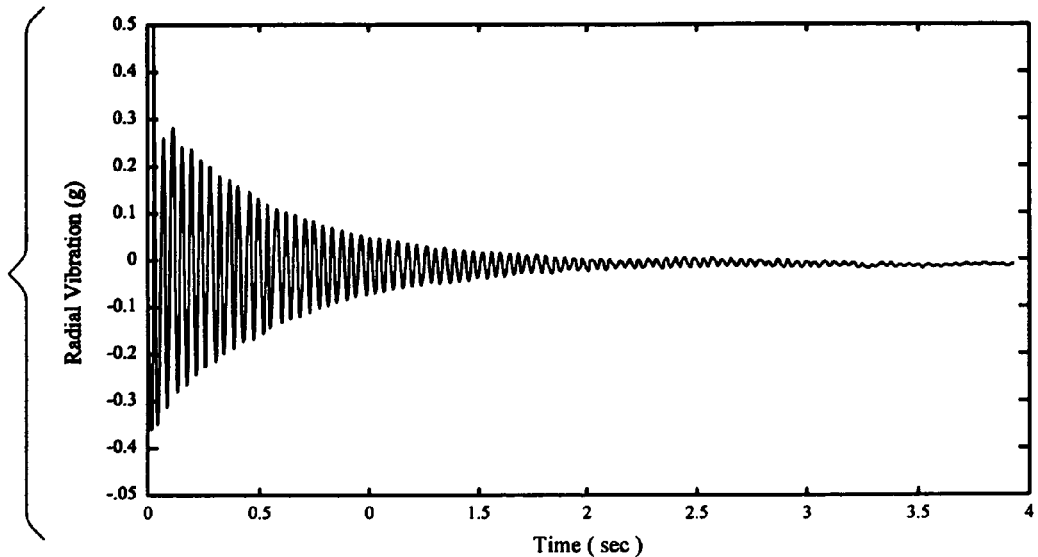
FIG. 5A is a chart showing an experiment result of time response of a conventional magnetic bearing.
Figure 5B:
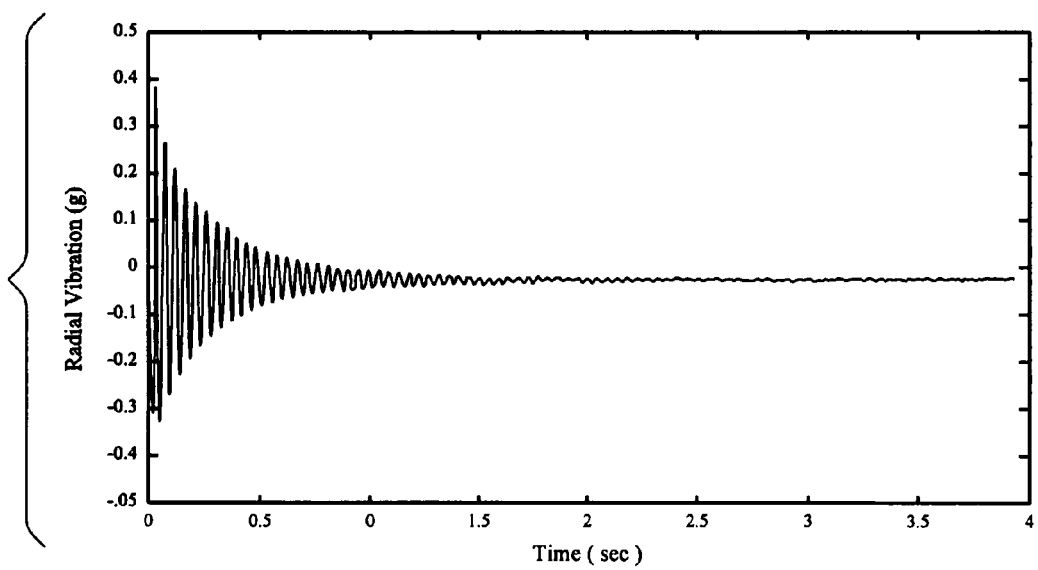
FIG. 5B is a chart showing an experiment result of time response of the magnetic suspension bearing with damping system of the invention.
Figure 6A:
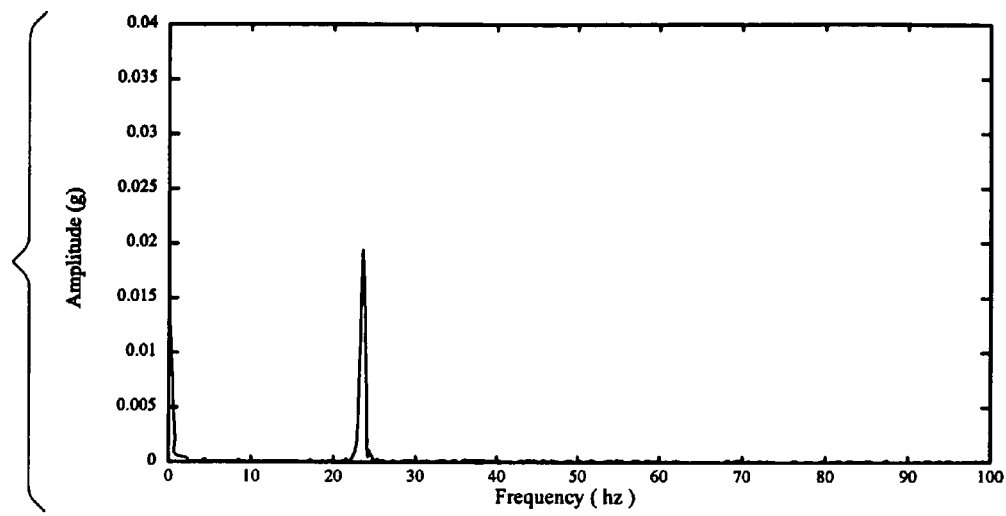
FIG. 6A is a chart showing an experiment result of the frequency response in radial direction of a conventional magnetic suspension bearing.
Figure 6B:
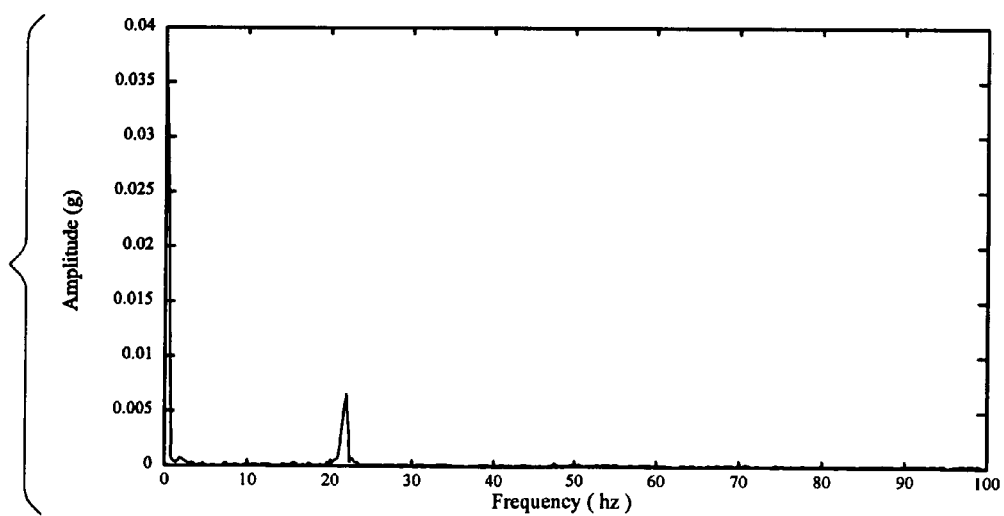
FIG. 6B is a chart showing an experiment result of frequency response in radial direction of the magnetic suspension bearing with damping system of the invention.

By using Fast Fourier Transform (FFT) and impulse method, we obtain experiment results of the time response of the invention as FIG. 5B, and experiment results of the frequency response of the invention as FIG. 6B.

Refer to FIGS. 5B and 6B, the experiment results indicate that the time response and related frequency response of the conventional techniques shown in FIGS. 5A and 6A are decreased in the invention. Namely, the magnetic damping device 40 greatly reduces the vibration of the rotor 20.

Figure 7:
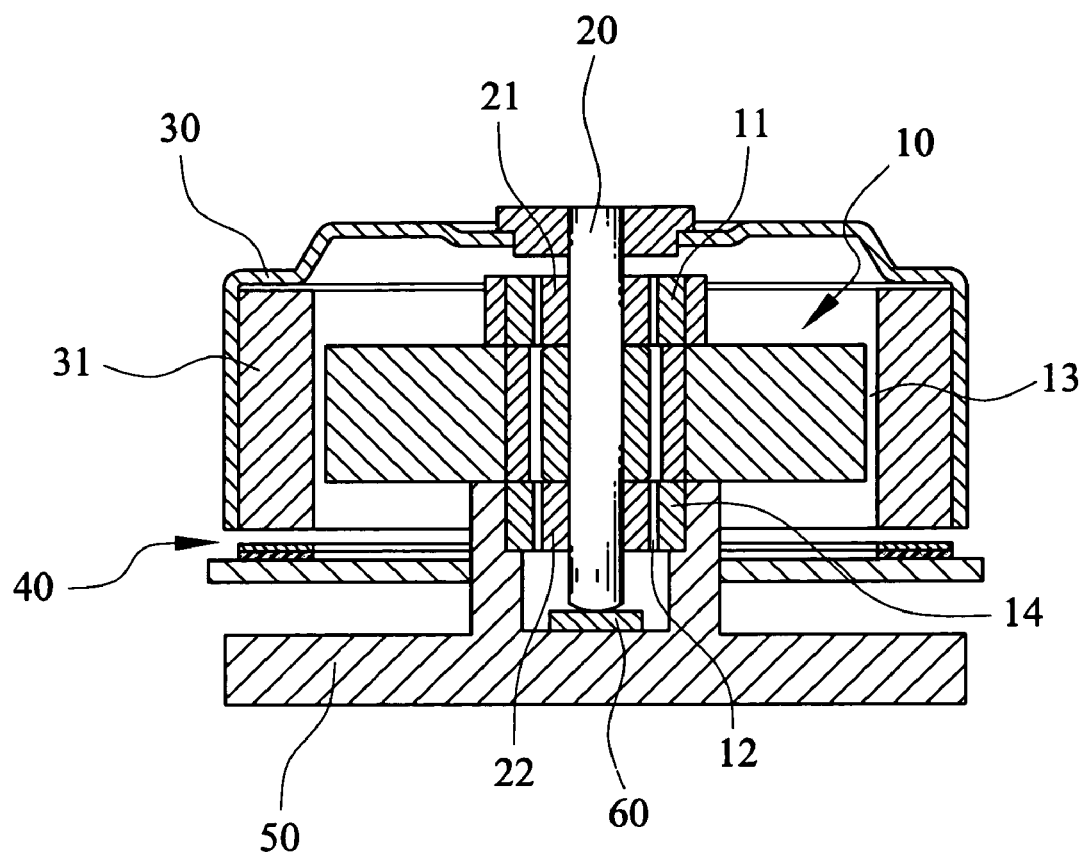
FIG. 7 is a sectional view of a second embodiment of the magnetic suspension bearing with damping system of the invention.
Figure 8:
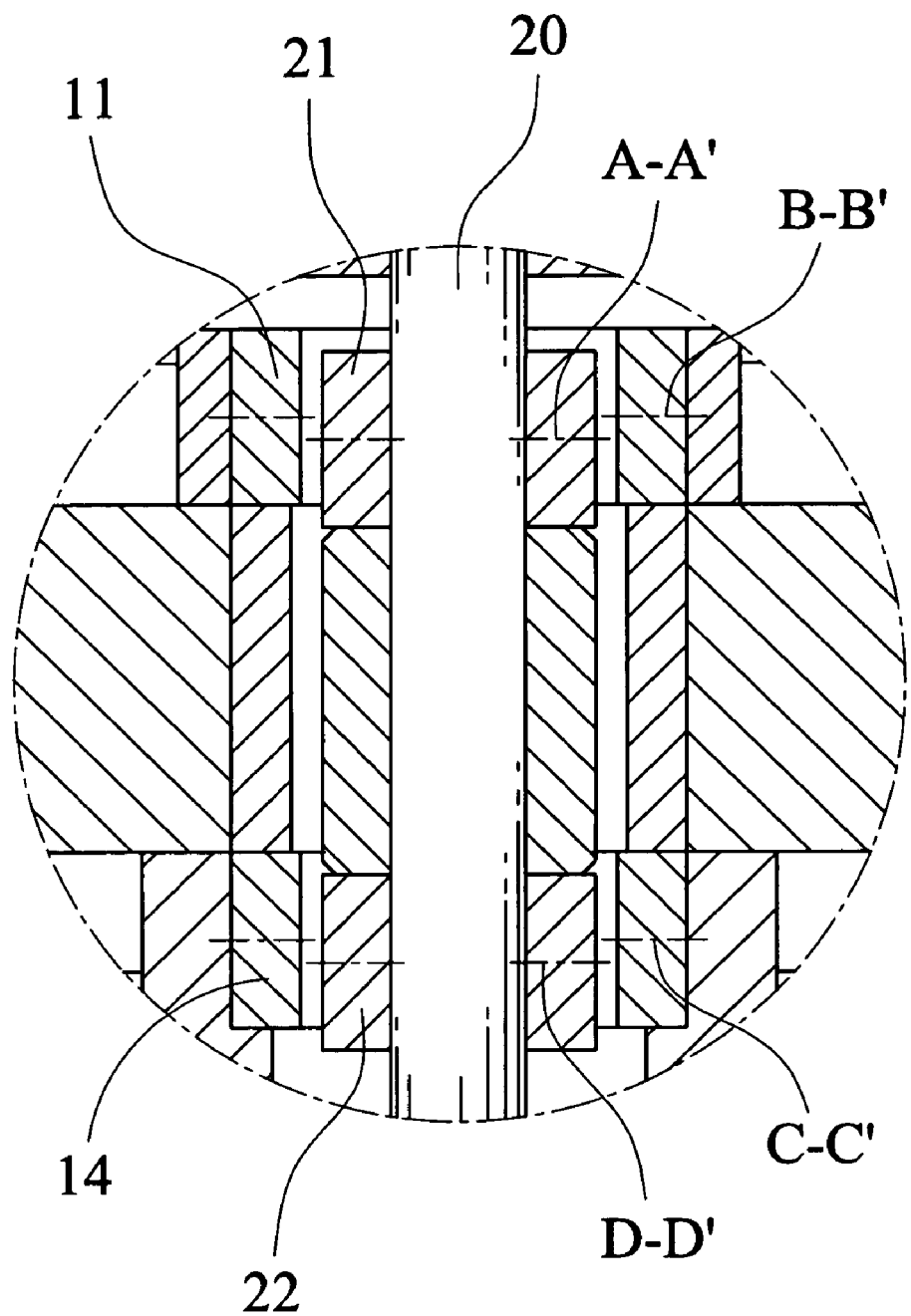
FIG. 8 is schematic view of the stator magnetic unit and the rotor magnetic unit of the second embodiment of the magnetic suspension bearing with damping system of the invention.

For further reduce the vibration of the rotor 20, please refer to FIG. 7 for yet another embodiment of the invention. The second embodiment of the invention includes a sub stator magnetic unit 14 located on the bottom side of the stator 10, and the stator magnetic unit 11 installed on the top side of the stator 10. Similarly, a sub rotor magnetic unit 22 corresponding to the sub stator magnetic unit mounts on the bottom side of the rotor 20, and the rotor magnetic unit 21 installs on the top side of the rotor 20 corresponding to the stator magnetic unit 11. In addition, refer to FIG. 8, the stator magnetic unit 11 has a magnetic center line B-B' and the rotor magnetic unit 21 also has a magnetic center line A-A'. The magnetic center line A-A' is lower than the magnetic center line B-B' for generating an axial prestressing force to the rotor 20. Likewise, the sub stator magnetic unit 14 has a magnetic center line C-C' and the sub rotor magnetic unit 22 also has a magnetic center line D-D'. The magnetic center line D-D' is lower than the magnetic center line C-C' for generating an axial prestressing force to the rotor 20.

Therefore, the axial prestressing force raises the friction properly between the rotor 20 and the loading section 60. Therefore, the axial prestressing force cooperates with the magnetic force between the magnetic damping device 40 and the magnetic driving unit 31 to apply the rotor 20 rotate smooth and steady, and substantially reduces the vibration of the rotor 20.

By means of the aforesaid constructions, it is clear that the magnetic suspension bearing with damping system of the invention can provide the following advantages:

1. Preventing generation of vibration and noise: compared with the conventional techniques that have swing appearance caused by the external force and then generated vibration and noise, the invention stabilizes the rotor through the magnetic damping system and decrease the amplitude of the vibration 2. Increasing service life of products: in general the swing of the rotor caused by the rotor frequently touch with the stator is the main reason for product damage and shorter service life. The invention can greatly reduce the vibration and noise, and product service life extends.

3. Effectively reducing cost: conventional techniques often have complex structures and are difficult to assemble, and result in increasing production cost. The invention provides a simple structure to reduce the vibration. Assembly is easy and product cost can be greatly reduced.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A magnetic suspension bearing with damping system, comprising:
    a stator having an internal portion and an external portion, and a stator magnetic unit mounted on the internal portion of the stator, the stator magnetic unit being provided at the top side of the stator, and the stator further including a sub stator magnetic unit located on the bottom side of the stator;
    a rotor rotatably located at the internal portion of the stator, including a rotor magnetic unit corresponding to the stator magnetic unit and a yoke coupling with an one end of the rotor, and the yoke having a magnetic driving unit corresponding to the external portion of the stator, the rotor further having a sub rotor magnetic unit, corresponding to the sub stator magnetic unit, located on the bottom side of the rotor; and
    a magnetic damping device located below the magnetic driving unit having a magnetic unit and an elastic unit; wherein the magnetic unit corresponding to the magnetic driving unit to generate magnetic force between them, and the elastic unit coupled below the magnetic unit to reduce the vibration of the magnetic unit,
    wherein the sub stator magnetic unit and the sub rotor magnetic unit separately have a magnetic center line, and the magnetic center line of the sub rotor magnetic unit is lower than the magnetic center line of the sub stator magnetic unit for generating an axial prestressing force to the rotor.

2. The magnetic suspension bearing with damping system of claim 1, wherein the elastic unit is made of rubber material.

3. The magnetic suspension bearing with damping system of claim 1 further having a loading section located on another end of the rotor to hold the rotor.

4. The magnetic suspension bearing with damping system of claim 3, wherein the loading section is a friction pad.

5. The magnetic suspension bearing with damping system of claim 3, wherein the rotor is in contact with the loading section on a single point.

6. The magnetic suspension bearing with damping system of claim 1, wherein the stator magnetic unit and rotor magnetic unit separately having a magnetic center line, and the magnetic center line of the rotor magnetic unit is lower than the magnetic center line of the stator magnetic unit for generating an axial prestressing force to the rotor.

7. The magnetic suspension bearing with damping system of claim 1, further comprising a base dock for holding the magnetic damping device.

8. A magnetic suspension bearing with damping system, comprising:
    a stator, having
        an internal portion,
        an external portion,
        a stator magnetic unit mounted on the internal portion and being provided at a top side of the stator, and
    a sub stator magnetic unit located on a bottom side of the stator, being coaxial with said stator magnetic unit, and being separated from said stator magnetic unit by a distance;
    a rotatable rotor, having
        a rotor magnetic unit corresponding to the stator magnetic unit and being disposed inside said stator magnetic unit,
        a sub rotor magnetic unit, corresponding to the sub stator magnetic unit, located on the bottom side of the rotor and being disposed inside said sub stator magnetic unit, being coaxial with said rotor magnetic unit, and being separated from said rotor magnetic unit by a distance, and
        a yoke coupling with one end of the rotor, the yoke having a magnetic driving unit corresponding to the external portion of the stator; and
    a magnetic damping device located below the magnetic driving unit, and having a magnetic unit and an elastic unit, the magnetic unit corresponding to the magnetic driving unit to generate a magnetic force therebetween, the elastic unit being coupled below the magnetic unit to reduce a vibration of the magnetic unit,
        wherein the sub stator magnetic unit and the sub rotor magnetic unit each separately have a magnetic center line, the magnetic center line of the sub rotor magnetic unit being lower than the magnetic center line of the sub stator magnetic unit for generating an axial prestressing force to the rotor; and
    wherein the stator magnetic unit and rotor magnetic unit each separately have a magnetic center line, the magnetic center line of the rotor magnetic unit being lower than the magnetic center line of the stator magnetic unit for generating an axial prestressing force to the rotor.

* * * * *